US012681631B2

(12) United States Patent　　　(10) Patent No.: US 12,681,631 B2
Liao et al.　　　　　　　　　　　　(45) Date of Patent: Jul. 14, 2026

(54) EDGE TOOL CONFIGURATION METHOD AND ELECTRONIC DEVICE

(71) Applicant: ASUSTeK COMPUTER INC., Taipei City (TW)

(72) Inventors: Chia-In Liao, Taipei City (TW);
Chih-Hsien Yang, Taipei City (TW);
Li-Te Yang, Taipei City (TW);
Yung-Hsuan Kao, Taipei City (TW);
Chen-Yu Hsu, Taipei City (TW);
Shun-Wen Huang, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 136 days.

(21) Appl. No.: 18/469,568

(22) Filed: Sep. 19, 2023

(65) Prior Publication Data

US 2025/0094033 A1　　Mar. 20, 2025

(51) Int. Cl.
G06F 3/04847　　(2022.01)
G06F 3/04886　　(2022.01)

(52) U.S. Cl.
CPC ...... G06F 3/04847 (2013.01); G06F 3/04886 (2013.01)

(58) Field of Classification Search
CPC .......................... G06F 3/04847; G06F 3/04886
See application file for complete search history.

(56) References Cited

U.S. PATENT DOCUMENTS

| | | | | |
|---|---|---|---|---|
| 9,043,714 B1 * | 5/2015 | Queru | ................. | G06F 3/04886 |
| | | | | 463/32 |
| 9,176,620 B2 * | 11/2015 | Ryu | .................... | G06F 3/04883 |
| 9,335,887 B2 | 5/2016 | Kwak et al. | | |
| 9,964,990 B2 * | 5/2018 | Saukko | ................. | H04M 1/724 |
| 10,304,163 B2 * | 5/2019 | Karunamuni | ....... | G06F 3/04886 |
| 10,872,585 B2 * | 12/2020 | Ge | ........................... | G09G 5/38 |
| 11,429,203 B2 | 8/2022 | Hinckley et al. | | |
| 11,841,998 B2 | 12/2023 | Hinckley et al. | | |
| 2007/0004451 A1 * | 1/2007 | Anderson | ............. | G06F 1/1626 |
| | | | | 455/556.1 |
| 2008/0165144 A1 * | 7/2008 | Forstall | ................. | G06F 1/1626 |
| | | | | 345/173 |
| 2010/0087230 A1 * | 4/2010 | Peh | ................... | H04M 1/72451 |
| | | | | 345/173 |
| 2011/0185040 A1 * | 7/2011 | Schmidt | ............. | G06F 16/9577 |
| | | | | 709/217 |

(Continued)

FOREIGN PATENT DOCUMENTS

| | | |
|---|---|---|
| CN | 106909376 | 8/2021 |
| CN | 112631475 | 11/2022 |

(Continued)

*Primary Examiner* — Tadesse Hailu
(74) *Attorney, Agent, or Firm* — JCIPRNET

(57) ABSTRACT

Disclosed are an edge tool configuration method and an electronic device. The edge tool configuration method includes: detecting a placement status of the electronic device through a sensor; reading configuration information of the edge tool according to the placement status, wherein the configuration information includes initial configuration information of the edge tool in a plurality of default placement statuses; placing the edge tool at an edge position in a display interface of a display according to the configuration information in the placement status.

14 Claims, 7 Drawing Sheets

(56)          References Cited

U.S. PATENT DOCUMENTS

| | | | |
|---|---|---|---|
| 2013/0219345 A1* | 8/2013 | Saukko ................. | H04M 1/724 |
| | | | 715/863 |
| 2014/0006986 A1* | 1/2014 | Cappucio .............. | G06F 3/0482 |
| | | | 715/765 |
| 2014/0165014 A1* | 6/2014 | Shen ....................... | G06F 3/045 |
| | | | 345/173 |
| 2014/0282051 A1* | 9/2014 | Cruz-Hernandez ..... | G06F 1/169 |
| | | | 715/744 |
| 2017/0139576 A1* | 5/2017 | Jeong ................... | G06F 3/0346 |
| 2019/0019476 A1* | 1/2019 | Ge .......................... | G06F 3/048 |

FOREIGN PATENT DOCUMENTS

| | | |
|---|---|---|
| CN | 115702411 | 2/2023 |
| TW | 201419125 | 5/2014 |
| TW | 201837688 | 10/2018 |

* cited by examiner

EDGE TOOL CONFIGURATION METHOD AND ELECTRONIC DEVICE

BACKGROUND

Technical Field

This disclosure relates to an edge tool configuration method and an electronic device.

Description of Related Art

Certain types of smartphone or tablet PC offer quick-start tools, also known as edge tools, in a display interface of the display for a user to easily operate the products. The user may click on the quick-start tools to quickly start certain applications. However, as placement status of an electronic device differs, the user may hold or operate the electronic device in different manners.

SUMMARY

This disclosure provides an edge tool configuration method adaptable for an electronic device, wherein the electronic device includes a sensor and a display. The edge tool configuration method includes: detecting a placement status of the electronic device through the sensor; reading configuration information of the edge tool according to the placement status, wherein the configuration information includes initial configuration information of the edge tool in a plurality of default placement statuses; and placing the edge tool at an edge position in display interface of the display according to the configuration information in the placement status.

The disclosure also provides an electronic device, which includes a sensor, a display, a storage circuit, and a processor. The storage circuit stores configuration information of the edge tool. The processor is coupled to the sensor, the display, and the storage circuit. The processor is configured to: detect a placement status of the electronic device through the sensor; read the configuration information according to the placement status, wherein the configuration information includes initial configuration information of the edge tool in a plurality of default placement statuses; and place the edge tool at an edge position in a display interface of the display according to the configuration information in the placement status.

Hence, by detecting a placement status of the electronic device through the sensor, configuration information of the edge tool is read according to the placement status. The configuration information includes information regarding an initial configured position of the edge tool in the plurality of default placement statuses. In the placement status, the edge tool is placed at an edge position in the display interface of the display according to the configuration information. Thus, regardless of the placement status of the electronic device, user experience in operations of the electronic device or the edge tool may be effectively improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
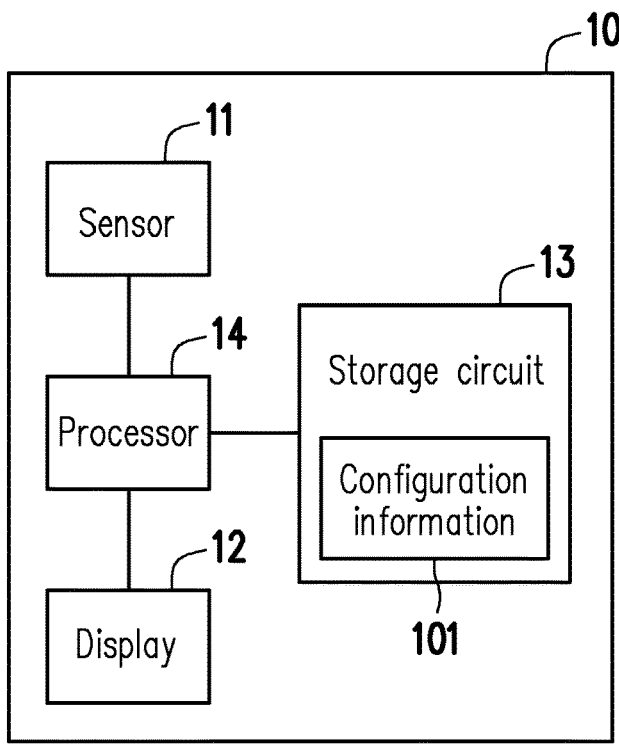
FIG. 1 is a schematic view illustrating an electronic device in an embodiment of this disclosure.

As FIG. 1 indicates, an electronic device 10 may be a smartphone, a tablet computer, an electronic reader, a smart watch, a game console, or any other portable electronic device with display function. The electronic device 10 is not limited to the aforementioned types.

The electronic device 10 may include a sensor 11, a display 12, a storage circuit 13, and a processor 14. The sensor 11 detects tilting of the electronic device 10. For example, the sensor 11 may include at least one of the following: gyroscope, g-sensor, accelerometer, and magnetic sensor. In an embodiment, tilting of the electronic device 10 may reflect how the electronic device 10 is in two-dimensional or three-dimensional space. Quantity of the sensor 11 may be singular or multiple, and this disclosure does not impose restrictions in this regard.

The display 12 shows images. For example, the display 12 may present image screens on its display interface for a user to watch. The display 12 may include plasma display, liquid crystal display (LCD), Thin Film Transistor (TFT) LCD, light emitting diode (LED) display, or Organic LED (OLED) display, and many other types of display.

The storage circuit 13 stores data. For example, the storage circuit 13 may include a volatile storage circuit and a non-volatile storage circuit. The volatile storage circuit may retain data in a volatile manner. For example, the volatile storage circuit may include Random Access Memory (RAM) or other similar volatile storage media. The non-volatile storage circuit retains data in a non-volatile manner. For example, the non-volatile storage circuit may include Read Only Memory (ROM), solid state disk (SSD), Hard disk drive (HDD), flash memory, embedded MultiMedia Card (eMMC), Universal Flash Storage (UFS) device, or other similar non-volatile storage media.

The processor 14 is coupled to the sensor 11, the display 12, and the storage circuit 13. The processor 14 may be in charge of entire or partial operation of the electronic device 10. For example, the processor 14 may include Central Processing Unit (CPU), Graphics Processing Unit (GPU), other programmable microprocessors that serve common or special purposes, Digital Signal Processor (DSP), programmable controller, Application Specific Integrated Circuits (ASIC), Programmable Logic Device (PLD), other similar devices or combinations thereof.

In an embodiment, the electronic device 10 may include various Input/Output (IO) devices, such as network interface card, touch panel, physical button, microphone, speaker, power management interface, and/or camera. The IO devices are not limited to the aforementioned types.

In an embodiment, the storage circuit 13 may be configured to store configuration information 101 of at least one quick-start tool, also known as an edge tool. The quick-start tool (the edge tool) may be used to quickly start a specific or a plurality of applications. Specifically, the configuration information 101 may include the initial configuration information of the edge tool in the plurality of default placement statuses.

In an embodiment, the processor 14 may detect a placement status of the electronic device 10 through the sensor 11. For example, the processor 14 may learn about the current placement status of the electronic device 10 according to sensing data returned by the sensor 11. For example, the placement status may reflect how the electronic device 10 is in two-dimensional or three-dimensional space, e.g., in a tilting position.

In an embodiment, the processor 14 may read the configuration information 101 from the storage circuit 13 according to the current placement status of the electronic device 10. In the current placement status, the processor 14 may place the edge tool at a certain position, also known as an edge position, in a display interface of the display 12 according to the configuration information 101. In an embodiment, the edge position is closer to the edge of display interface than it is to the center of display interface. In an embodiment, the edge tool is placed at an edge of the display interface.

In an embodiment, the processor 14 determines that the current placement status of the electronic device 10 is one of the plurality of default placement statuses, also known as a target placement status, according to the sensing data returned by the sensor 11. Meanwhile, the processor 14 fetches initial configuration information corresponding to the target placement status from the configuration information 101. The processor 14 may decide where the edge tool is presented in the display interface, i.e., in the edge position according to the initial configuration information corresponding to the target placement status. Subsequently, the processor 14 may instruct the display 12 to present the edge tool at the edge position.

In an embodiment, after the display 12 presenting the edge tool, a user may conduct a specific user operation on the edge tool presented by the display 12 to trigger the edge tool. For example, the user may trigger the edge tool by single-clicking on the edge tool, double-clicking on the edge tool, or pressing and holding on the edge tool. In response to that the edge tool is triggered, the processor 14 auto-executes at least one application. For example, in response to that the edge tool is triggered, the processor 14 may auto-execute a specific application in the foreground of the electronic device 10.

In an embodiment, regardless of the current placement status of the electronic device 10, the processor 14 is capable of controlling the display 12 regarding at which position the edge tool is presented on the display interface of the display 12 according to the configuration information 101. The user thereafter triggers the edge tool through a specific user operation in order to quickly start or run a specific application. Hence, user experience in operations of the electronic device 10 (or the edge tool) may be effectively improved.

Figure 2:
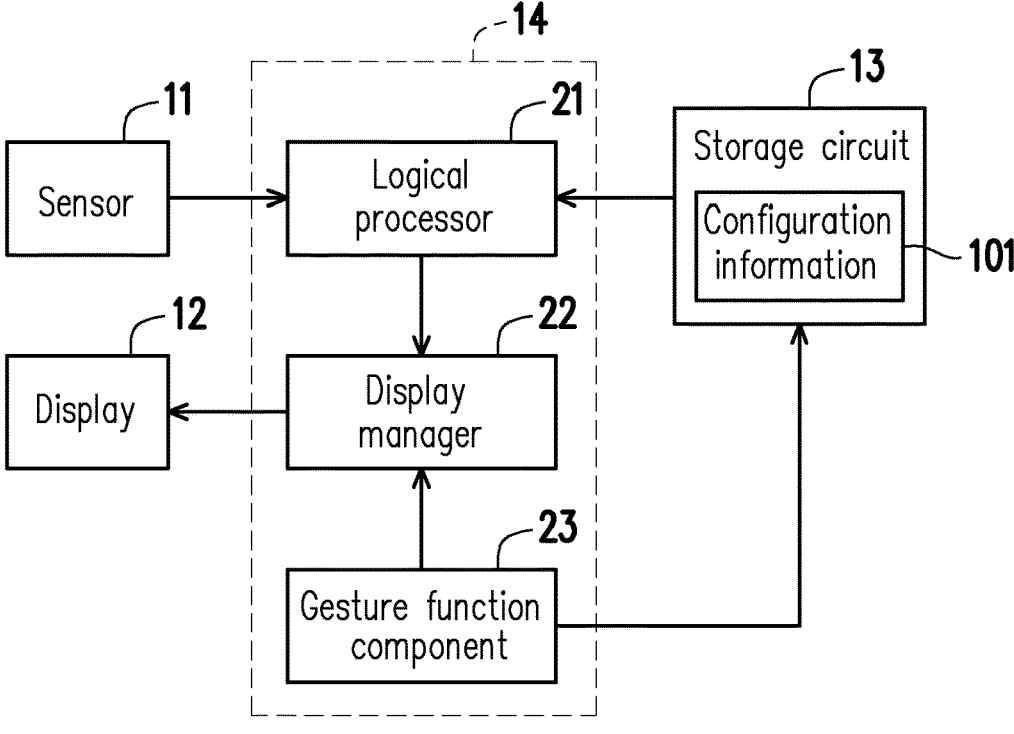
FIG. 2 is a schematic view illustrating how the electronic device functions in an embodiment of this disclosure.

As FIG. 2 indicates, in an embodiment, the processor 14 includes a logical processor 21, a display manager 22, and a gesture function component 23. The logical processor 21, the display manager 22, and the gesture function component 23 may be implemented as software, firmware, or hardware, respectively. This disclosure does not impose restrictions in this regard.

In an embodiment, the logical processor 21 may learn about the placement status of the electronic device 10, i.e., the target placement status, according to sensing data from the sensor 11. Subsequently, the logical processor 21 fetches the initial configuration information corresponding to the target placement status from the configuration information 101. For example, the initial configuration information includes position description information with respect to the edge position, e.g., coordinates of the edge position. The display manager 22 may instruct the display 12 to present the edge tool at the edge position according to the initial configuration information.

In an embodiment, after the display 12 presenting the edge tool, the gesture function component 23 detects a user operation for triggering the edge tool. After detecting the user operation for triggering the edge tool, the display manager 22 may instruct the display 12 to present screen of at least one of the auto-executed applications in the foreground.

In an embodiment, the gesture function component 23 may detect a user operation for adjusting a configured position of the edge tool. In response to the user operation, the gesture function component 23 updates the configuration information 101 in the storage circuit 13 in order to adjust the initial configuration information of the edge tool.

In an embodiment, in response to that the current placement status of the electronic device 10 is one of the plurality of default placement statuses (also known as the first placement status), the processor 14 places the edge tool at a certain position (also known as the first edge position) in the display interface of the display 12. In another embodiment, in response to that the current placement status of the electronic device 10 is another one of the plurality of default placement statuses (also known as the second placement status), the processor 14 may place the edge tool at another position (also known as the second edge position) in the display interface of the display 12. The first placement status differs from the second placement status. The first edge position differs from the second edge position.

In an embodiment, the electronic device 10 is operated in a vertical mode while being in the first placement status. In another embodiment, the electronic device 10 is operated in a horizontal mode or in a full-screen mode while being in the second placement status.

Figure 3A:
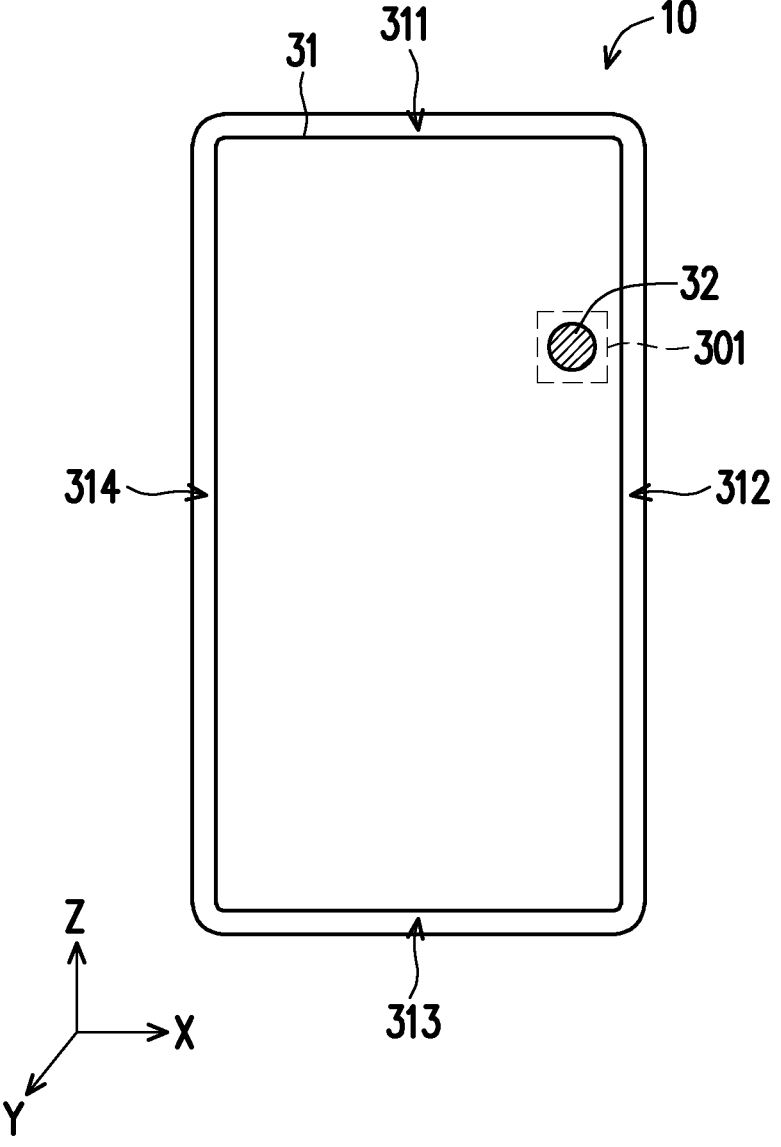
FIG. 3A is a schematic view illustrating how the edge tool is presented in the first placement status in an embodiment of this disclosure.

As FIG. 1 and FIG. 3A indicate, in an embodiment, the electronic device 10 is presumed to be operated in the vertical mode. The processor 14 may therefore determine that the current placement status of the electronic device 10 is the first placement status. That is, the target placement status is the first placement status. In the first placement status, the processor 14 may control the display 12 to display the edge tool 32 at a position 301 (an edge position) on the display interface 31. In an embodiment, the display interface 31 is presumed has sides 311~314. The position 301 is closer to the side 312 than it is to the side 311, the side 313, and the side 314, as illustrated by FIG. 3A.

Figure 3B:
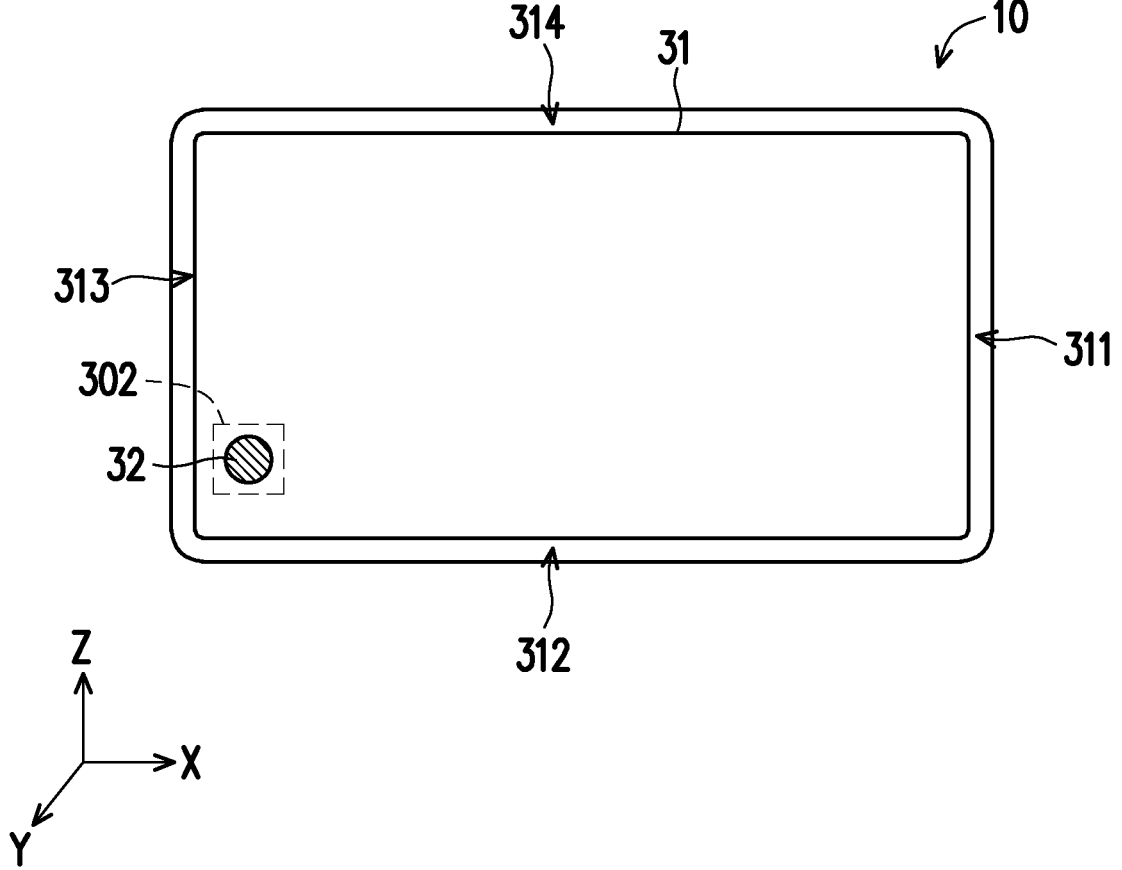
FIG. 3B is a schematic view illustrating how the edge tool is presented in the second placement status in an embodiment of this disclosure.

As FIG. 1 and FIG. 3B indicate, in an embodiment, the electronic device 10 is presumed to be operated in a horizontal mode or a full-screen mode. The processor 14 may therefore determine that the current placement status of the electronic device 10 is the second placement status. That is, the target placement status is the second placement status. In the second placement status, the processor 14 may control the display 12 to display the edge tool 32 at a position 302 (an edge position) in the display interface 31. Note that the position 302 in FIG. 3B differs from the position 301 in FIG. 3A. The position 302 is closer to the side 313 than it is to the side 311, the side 312, and the side 314, as illustrated by FIG. 3B.

In an embodiment, in the first placement status, the processor 14 may receive a user operation, also known as the first user operation. For example, the first user operation may include moving the edge tool on the display interface. The processor 14 may update the configuration information 101 according to the first user operation in order to adjust the initial configuration information of the edge tool in the first placement status, also known as the first initial configuration information. For example, the updated configuration information 101 includes the adjusted first initial configuration information. The updated configuration information 101 may be stored back to the storage circuit 13.

In an embodiment, in the second placement status, the processor 14 may receive a user operation, also known as the second user operation. For example, the second user operation includes moving the edge tool on the display interface. The processor 14 may update the configuration information 101 according to the second user operation in order to adjust the initial configuration information of the edge tool while the device is in the second placement status, also known as the second initial configuration information. For example, the updated configuration information 101 may include the adjusted second initial configuration information. The updated configuration information 101 may be stored back to the storage circuit 13.

Figure 4A:
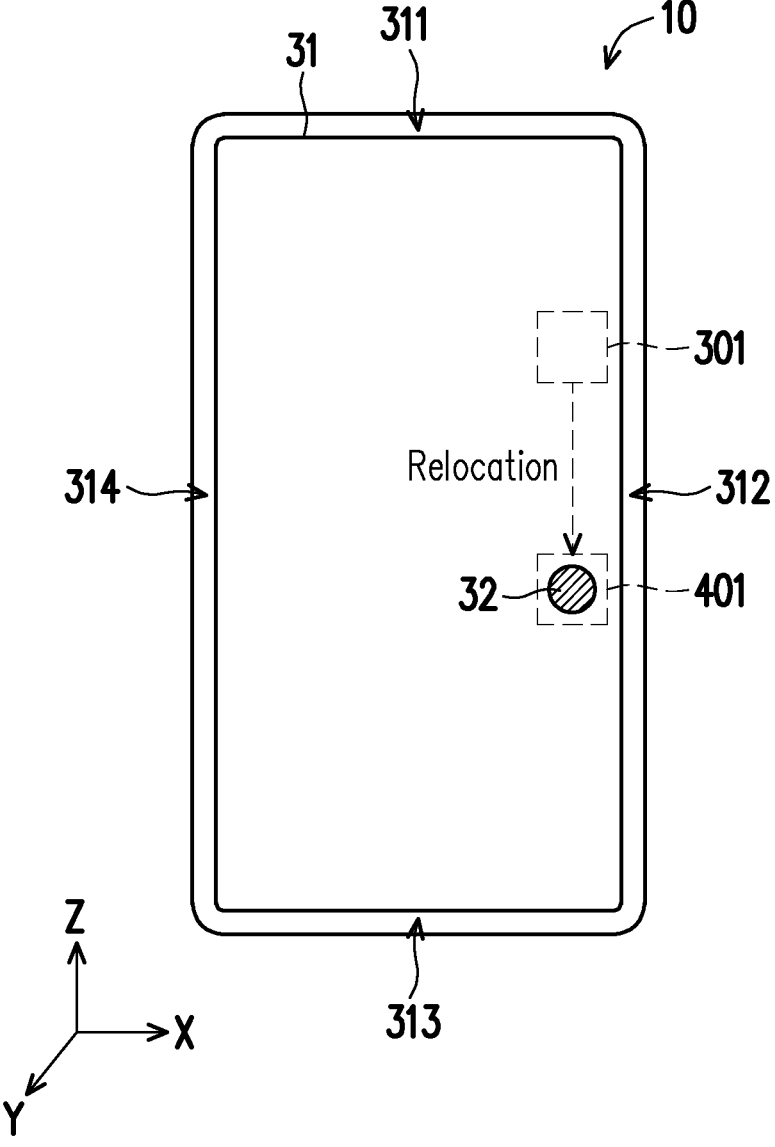
FIG. 4A is a schematic view illustrating how to adjust the configured position of the edge tool in the first placement status in an embodiment of this disclosure.

As FIG. 1 and FIG. 4A indicate, in an embodiment, the electronic device 10 is presumed to be operated in the vertical mode. The processor 14 may therefore determine that the current placement status of the electronic device 10 is the first placement status. In the first placement status, the processor 14 may receive a user operation, i.e., the first user operation. The processor 14 may move the edge tool 32 on the display interface 31 according to the first user operation. That is, the processor 14 may relocate the edge tool 32, e.g., moving the edge tool 32 from the position 301 to a position 401 (an edge position). In response to the first user operation, i.e., moving the edge tool 32 to the position 401, the processor 14 may update the configuration information 101. For example, the processor 14 may adjust the initial configuration information of the edge tool 32 in the first placement status, i.e., the first initial configuration information. The adjusted first initial configuration information includes position description information with respect to the position 401, e.g., coordinates of the position 401. Thereafter, as the placement status of the electronic device 10 is detected as the first placement status, the processor 14 may present the edge tool 32 at the position 401 in the display interface 31 according to the updated configuration information 101.

Figure 4B:
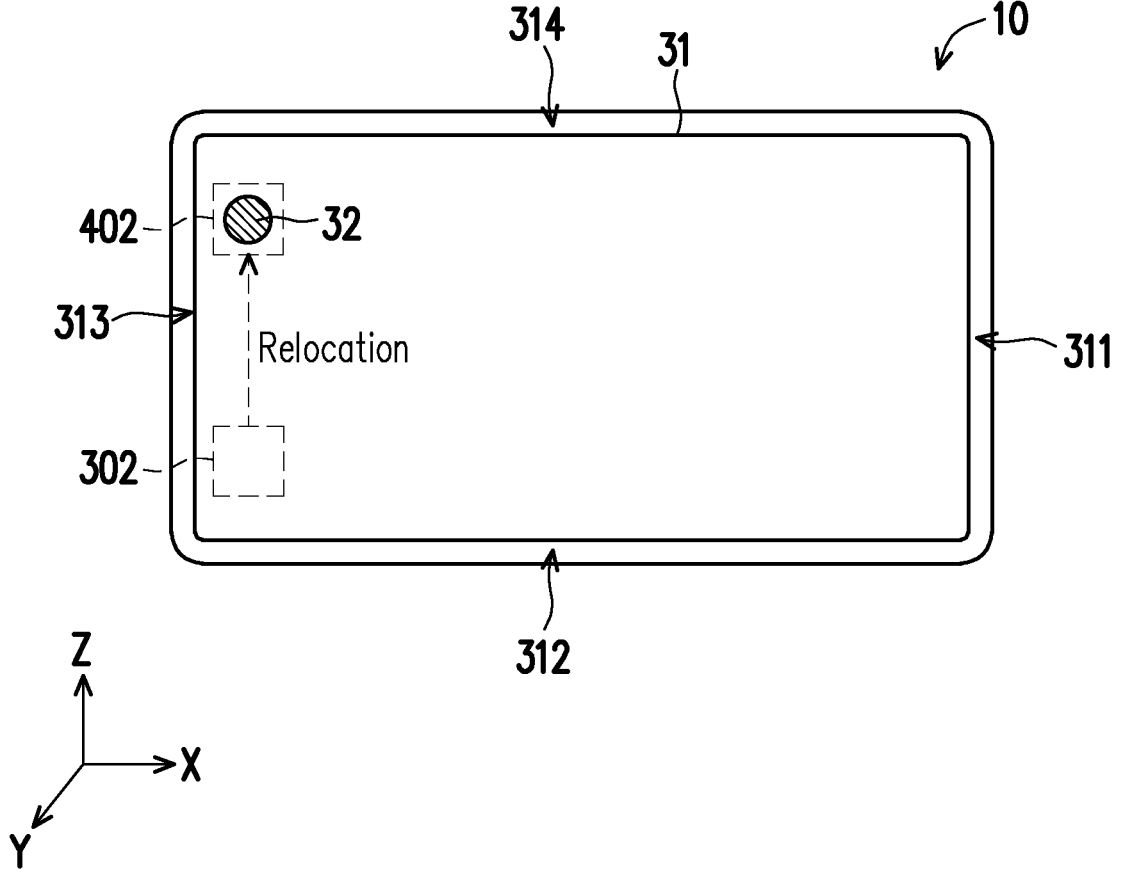
FIG. 4B is a schematic view illustrating how to adjust the configured position of the edge tool in the second placement status in an embodiment of this disclosure.

As FIG. 1 and FIG. 4B indicate, in an embodiment, the electronic device 10 is presumed to be operated in the horizontal mode or the full-screen mode. The processor 14 may therefore determine that the current placement status of the electronic device 10 is the second placement status. In the second placement status, the processor 14 may receive a user operation, i.e., the second user operation. The processor

14 may move the edge tool 32 on the display interface 31 according to the second user operation. That is, the processor 14 may relocate the edge tool 32, e.g., moving the edge tool 32 from the position 302 to a position 402 (an edge position). In response to the second user operation, i.e., moving the edge tool 32 to the position 402, the processor 14 may update the configuration information 101. For example, the processor 14 may adjust the initial configuration information of the edge tool 32 in the second placement status, i.e., the second initial configuration information. The adapted second initial configuration information includes position description information with respect to the position 402, e.g., coordinates of the position 402. Thereafter, as the placement status of the electronic device 10 is detected as the second placement status, the processor 14 may present the edge tool 32 at the position 402 in the display interface 31 according to the updated configuration information 101.

In an embodiment, as the electronic device 10 is in the current placement status, the processor 14 may detect an application running in the foreground of the electronic device 10 and according to the application, decide or adjust the configured position, i.e., the edge position, of the edge tool. Subsequently, the processor 14 may place the edge tool at the adjusted edge position in the display interface.

In an embodiment, as an application running in foreground of the electronic device 10 switches from one to another, i.e., from the first application to the second application, the processor 14 adjusts the edge position by relocating the edge position from one (the third edge position) to another (the fourth edge position). The first application differs from the second application. The third edge position differs from the fourth edge position.

Figure 5:
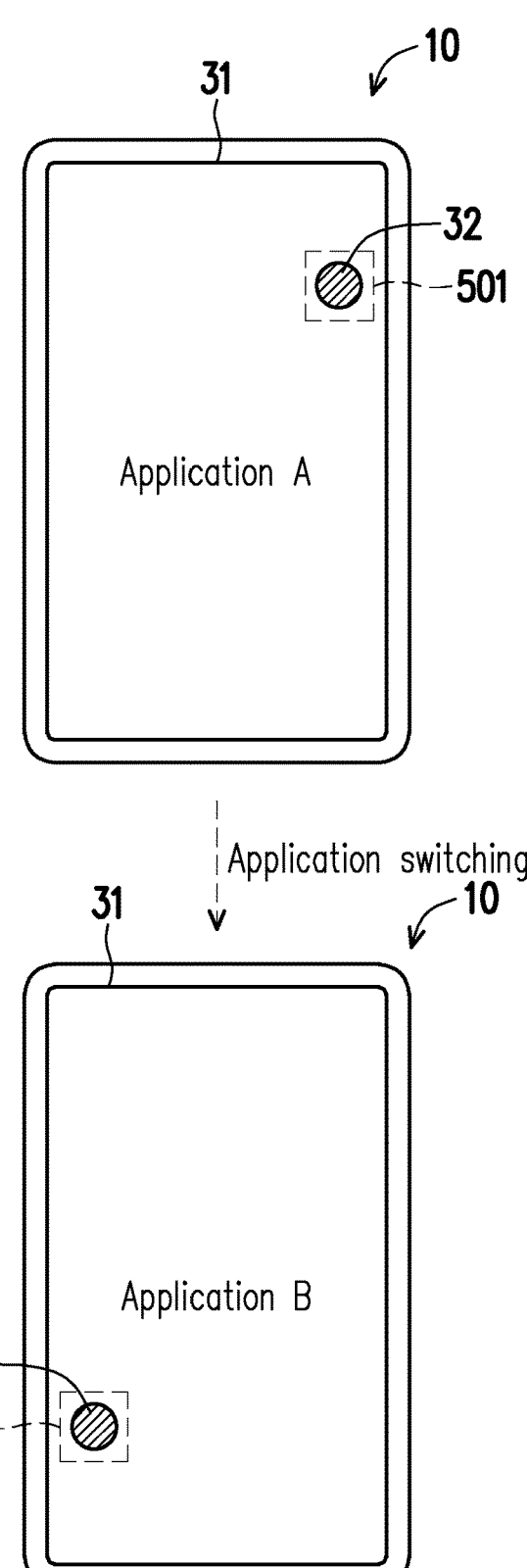
FIG. 5 is a schematic view illustrating how to adjust the configured position of the edge tool according to the application running in a foreground in an embodiment of this disclosure.

As FIG. 5 indicates, for example, in the first placement status, an application running in the foreground of the electronic device 10 is application A. The processor 14 may place the edge tool 32 at a position 501 in the display interface 31, i.e., in the third edge position. Alternatively, as an application running in the foreground of the electronic device 10 is application B, the processor 14 may place the edge tool 32 at a position 502, i.e., at the fourth edge position, in the display interface 31. The position 501 differs from the position 502.

In an embodiment, as the application running in the foreground of the electronic device 10 switches from the application A to the application B, the processor 14 adjusts the configured position of the edge tool 32 by relocating the configured position of the edge tool 32 from the original position 501 to the position 502. Hence, as the application running in the foreground varies, user experience in operations of the electronic device 10 (or the edge tool 32) may be effectively improved.

In an embodiment, the position 501 and/or the position 502 may be set or adjusted according to the user operation. For example, position description information related to the position 501, e.g., coordinates of the position 501, and/or position description information related to the position 502, e.g., coordinates of the position 502, are recorded in the configuration information 101, updated or adjusted according to the user operation. Thereafter, in the first placement status, in response to the application A running in the foreground, the processor 14 may automatically place the edge tool 32 at the position 501 in the display interface 31 according to the configuration information 101. Alternatively, in the first placement status, in response to the application B running in the foreground of the electronic device 10, the processor 14 may automatically place the edge tool 32 at the position 502 in the display interface 31 according to the configuration information 101. Likewise, in the second placement status, the configured position of the edge tool 32 may be dynamically determined according to the application currently running in the foreground. Redundant description is hereby duly omitted.

Note that the edge tool 32 in FIG. 3A, FIG. 3B, FIG. 4A, FIG. 4B and FIG. 5 is merely exemplary, and thus style and position of the edge tool 32 may be further adjusted to fulfill practical requirements. This disclosure does not impose restrictions in this regard. Moreover, the edge tool 32 may be placed at the edge position in other manners. For example, the edge tool 32 may be hidden, in color-faded display, or retracted into one side of the display interface 31. This disclosure does not impose restrictions in this regard. In an embodiment, by triggering the edge tool 32, a user interface is presented. Through the user interface, a user may add or remove an application that supports quick start of application.

Figure 6:
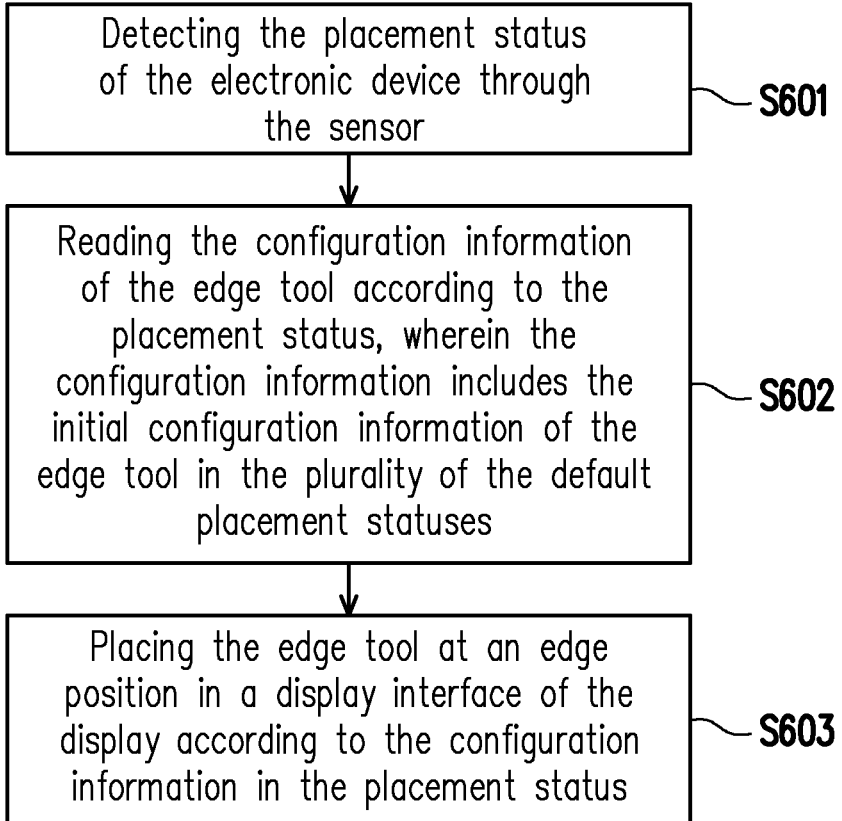
FIG. 6 is a flow chart of the edge tool configuration method in an embodiment of this disclosure.

As FIG. 6 indicates, in step S601, the placement status of the electronic device is detected by a sensor. In step S602, the configuration information of the edge tool is read according to the placement status. The configuration information includes the initial configuration information of the edge tool in the plurality of default placement statuses. In step S603, in the placement status, the edge tool is placed at an edge position in the display interface of the display according to the configuration information.

In a nutshell, the embodiments of this disclosure provide the edge tool configuration method and the electronic device to detect the current placement status of the electronic device and to present the edge tool at a specific position (the edge position) in the display interface in accordance with the configuration information. In some embodiments, the edge position is dynamically determined according to the application currently running in the foreground. Besides, while in different placement statuses, a user may adjust the edge position through a specific user operation. For example, the user moves the edge position to the handiest spot for operation. The user thereafter triggers the edge tool through a specific user operation in order to quickly start or run a specific application. Hence, user experience in operations of the electronic device or the edge tool may be effectively improved.

Although the disclosure has been described with reference to the above embodiments, it will be apparent to a person having ordinary skill in the art that modifications to the described embodiment may be made without departing from the spirit of the disclosure. Accordingly, the scope of the disclosure will be defined by the attached claims not by the above detailed descriptions.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An edge tool configuration method adaptable for an electronic device, wherein the electronic device has a sensor and a display, and the edge tool configuration method comprising:
   detecting a placement status of the electronic device through the sensor;
   reading configuration information of an edge tool according to the placement status, wherein the configuration information comprises initial configuration information of the edge tool in a plurality of default placement statuses; and
   placing the edge tool at an edge position in a display interface of the display according to the configuration information in the placement status,
   wherein the step of placing the edge tool at the edge position in the display interface of the display according to the configuration information in the placement status comprises:
   in response to an application running in a foreground of the electronic device being changed and the placement status being not changed, adjusting a coordinate of the edge position at where the edge tool being placed from a first coordinate to a second coordinate without changing an appearance of the edge tool itself; and
   when the edge tool is triggered, presenting a user interface and then adding or removing an application supporting quick-start through the user interface.

2. The edge tool configuration method according to claim 1, wherein the step of placing the edge tool at the edge position in the display interface of the display according to the configuration information in the placement status comprises:
   determining that the placement status is a target placement status among the plurality of default placement statuses according to sensing data returned by the sensor;
   fetching initial configuration information corresponding to the target placement status from the configuration information;
   determining the edge position in the display interface according to the initial configuration information corresponding to the target placement status; and
   instructing the display to present the edge tool at the edge position.

3. The edge tool configuration method according to claim 1, wherein the step of placing the edge tool at the edge position in the display interface of the display according to the configuration information in the placement status comprises:
   in response to the placement status being a first placement status among the plurality of default placement statuses, placing the edge tool at a first edge position in the display interface; and
   in response to the placement status being a second placement status among the plurality of default placement statuses, placing the edge tool at a second edge position in the display interface,
   wherein the first placement status differs from the second placement status and the first edge position differs from the second edge position.

4. The edge tool configuration method according to claim 3, wherein while being in the first placement status, the electronic device is operated in a vertical mode and while being in the second placement status, the electronic device is operated in a horizontal mode or a full-screen mode.

5. The edge tool configuration method according to claim 3, further comprising:
   receiving a first user operation in the first placement status;
   updating the configuration information to adjust first initial configuration information of the edge tool in the first placement status according to the first user operation;
   receiving a second user operation in the second placement status; and updating the configuration information to adjust second initial configuration information of the edge tool in the second placement status according to the second user operation.

6. The edge tool configuration method according to claim 1, wherein the step of placing the edge tool at the edge position in the display interface of the display according to the configuration information in the placement status further comprises:

detecting the application running in the foreground of the electronic device in the placement status;

determining the edge position according to the application; and placing the edge tool at the adjusted edge position in the display interface.

7. The edge tool configuration method according to claim 6, wherein the step of determining the edge position according to the application comprises:

in response to the application running in the foreground of the electronic device switching from a first application to a second application, relocating the edge position from a third edge position to a fourth edge position, wherein the first application differs from the second application and the third edge position differs from the fourth edge position.

8. An electronic device, comprising:

a sensor;

a display;

a storage circuit, configured to store configuration information of an edge tool; and a processor, coupled to the sensor, the display, and the storage circuit, wherein the processor is configured to:

detect a placement status of the electronic device through the sensor;

read the configuration information according to the placement status, wherein the configuration information comprises initial configuration information of the edge tool in a plurality of default placement statuses; and place the edge tool at an edge position in a display interface of the display according to the configuration information in the placement status, wherein the operation of placing the edge tool at the edge position in the display interface of the display according to the configuration information in the placement status comprises:

in response to an application running in a foreground of the electronic device being changed and the placement status being not changed, adjusting a coordinate of the edge position at where the edge tool being placed from a first coordinate to a second coordinate without changing an appearance of the edge tool itself; and when the edge tool is triggered, presenting a user interface and then adding or removing an application supporting quick-start through the user interface.

9. The electronic device according to claim 8, wherein the operation of placing the edge tool at the edge position in the display interface of the display according to the configuration information in the placement status comprises:

determining that the placement status is a target placement status among the plurality of default placement statuses according to sensing data returned by the sensor;

fetching initial configuration information corresponding to the target placement status from the configuration information;

determining the edge position in the display interface according to the initial configuration information corresponding to the target placement status; and instructing the display to present the edge tool at the edge position.

10. The electronic device according to claim 8, wherein the operation of placing the edge tool at the edge position in the display interface of the display according to the configuration information in the placement status comprises:

in response to the placement status being a first placement status among the plurality of default placement statuses, placing the edge tool at a first edge position in the display interface; and in response to the placement status being a second placement status among the plurality of default placement statuses, placing the edge tool in a second edge position in the display interface, wherein the first placement status differs from the second placement status and the first edge position differs from the second edge position.

11. The electronic device according to claim 10, wherein while being in the first placement status, the electronic device is operated in a vertical mode and while being in the second placement status, the electronic device is operated in a horizontal mode or a full-screen mode.

12. The electronic device according to claim 10, wherein the processor is further configured to:

receive a first user operation in the first placement status;

updating the configuration information to adjust first initial configuration information of the edge tool in the first placement status according to the first user operation;

receive a second user operation in the second placement status; and updating the configuration information to adjust second initial configuration information of the edge tool in the second placement status according to the second user operation.

13. The electronic device according to claim 8, wherein the operation of placing the edge tool at the edge position in the display interface of the display according to the configuration information in the placement status further comprises:

detecting the application running in the foreground of the electronic device in the placement status;

determining the edge position according to the application; and placing the edge tool at the adjusted edge position in the display interface.

14. The electronic device according to claim 13, wherein the operation of determining the edge position through the processor according to the application comprises:

in response to the application running in the foreground of the electronic device switching from a first application to a second application, relocating the edge position from a third edge position to a fourth edge position, wherein the first application differs from the second application and the third edge position differs from the fourth edge position.

* * * * *